United States Patent [19]

Motal

[11] Patent Number: 4,745,583
[45] Date of Patent: May 17, 1988

[54] MARINE CABLE SYSTEM WITH AUTOMATIC BUOYANCY CONTROL

[75] Inventor: Gary W. Motal, Houston, Tex.

[73] Assignee: Exxon Production Research Company, Houston, Tex.

[21] Appl. No.: 943,091

[22] Filed: Dec. 18, 1986

[51] Int. Cl.4 .............................................. G01V 1/38
[52] U.S. Cl. .................................... 367/18; 367/106; 367/130; 367/16; 114/245
[58] Field of Search ................... 367/16, 18, 106, 130; 114/245

[56] References Cited

U.S. PATENT DOCUMENTS

| | | | |
|---|---|---|---|
| 2,871,665 | 2/1959 | Brandt | 367/18 |
| 3,375,324 | 3/1968 | Miller | 174/101.5 |
| 3,412,704 | 11/1968 | Buller et al. | 114/235 |
| 3,673,556 | 6/1972 | Biggs | 340/7 |
| 3,794,965 | 2/1974 | Charske | 340/7 |
| 3,909,774 | 9/1975 | Pavey, Jr. | 340/7 |
| 4,135,141 | 1/1979 | Caldwell et al. | 367/18 |

*Primary Examiner*—Thomas H. Tarcza
*Assistant Examiner*—Daniel T. Pihulis
*Attorney, Agent, or Firm*—Alfred A. Equitz; Karen T. Burleson

[57] ABSTRACT

A marine cable system including one or more elongated cable sections whose buoyancy may be independently controlled. Each section is associated with a pump and a variable volume, elongated bladder. In one embodiment, one reservoir containing buoyant fluid is included, and fluid from the reservoir is pumped between adjacent sections to inflate or deflate the associated bladders. In another embodiment, a rigid reservoir containing compressed gas is included in each section. The associated pump releases gas from the reservoir to inflate the bladder, or pumps gas from the bladder into the reservoir when desired. The pumps are operated in response to control signals from a remote control unit, such as one aboard a vessel towing the cable. One or more depth sensors may be attached in or near each section. Depth information from the sensors may be supplied to the control unit for use in generating the pump control signals. The buoyant fluid is entirely contained within the cable. No buoyant fluid is transferred between the cable interior and the medium surrounding the cable.

5 Claims, 2 Drawing Sheets

MARINE CABLE SYSTEM WITH AUTOMATIC BUOYANCY CONTROL

FIELD OF THE INVENTION

This invention relates generally to automatic buoyancy control of marine cables, or streamers, of the type towable by a marine vessel. More specifically, the invention relates to marine cable (or streamer) systems including one or more variable volume bladders, and a pump for each bladder for transferring fluid into and out of the bladder, where the buoyancy of one or more individual cable (or streamer) sections is controlled by varying the volume of fluid in each bladder disposed within the relevant section or sections.

BACKGROUND OF THE INVENTION

Marine cables are conventionally towed behind marine vessels for a variety of purposes, including sonar scanning and marine seismic surveying. It is often desirable to vary automatically the depth at which each portion of a marine cable is towed. For example, in marine seismic surveying, one or more marine cables (known as "streamers") including hydrophones are towed by a vessel. The streamers may be several kilometers or more in length. It is desirable to control independently and automatically the depth of each cable section. Often, it is desired to maintain the entire streamer in a horizontal position, so that each hydrophone is towed at the same depth. Alternatively, it is sometimes desired to maintain some sections of the streamer at shallower depths than other sections, such as to pass the streamer over a reef.

Various systems have been devised for maintaining a marine cable at a desired depth. For example, "point control" systems have been developed in which points along the cable may be raised or lowered. Examples include the systems described in U.S. Pat. No. 3,673,556, issued June 27, 1972 to Biggs and U.S. Pat. No. 3,412,704, issued Nov. 26, 1968 to Buller, et al, both of which disclose a winged device that may be attached at a selected point along the cable's longitudinal axis. Point control systems have the disadvantage that the individual depth control elements (sometimes referred to as "paravanes" or "birds") tend to cause humps or droops in the cable profile as the birds oppose the natural tendencies of a cable whose natural ballast (i.e., the cable density absent the birds) differs significantly from the water density at the cable depth. This phenomenon often causes unacceptable background noise levels even with moderately well ballasted cables.

Systems have been developed that avoid the disadvantage of point control systems, such as by adding or removing buoyant fluid (usually oil) to or from elongated sections of a marine cable (or from the entire length of the cable) to modify the cable's effective density. Conventional systems of this type, however, possess numerous limitations including the following: cable depth control procedures that are time consuming and cumbersome or likely to produce an unstable condition; the need to pre-select a cable depth at the time of cable deployment; presence of bulky pressurized fluid lines throughout the length of the cable; or the requirement that buoyant fluid be discharged into the water to decrease cable buoyancy (with attendant risk of environmental damage); or various combinations of these limitations.

For example, U.S. Pat. No. 3,909,774, issued Sept. 30, 1975 to Pavey, Jr. discloses a marine cable buoyancy control system including a buoyant fluid supply line extending the length of the cable, valve means for diverting buoyant fluid from the supply line into sections of the cable, and valve means for discharging buoyant fluid from the cable sections into the surrounding environment. A disadvantage of the Pavey system is that buoyant fluid is discharged into the surrounding environment. Another disadvantage of the Pavey system is that Pavey employs a high pressure, high flow volume, buoyant fluid supply line extending the length of the cable. Such a line would have larger diameter (possibly requiring a larger cable outside diameter), and would require higher capacity pressure maintenance equipment, than the present invention. Furthermore, should the long fluid supply line of the Pavey system develop a leak, a large volume of buoyant fluid would be discharged to the surrounding environment.

U.S. Pat. No. 3,794,965, issued Feb. 26, 1974 to Charske discloses a marine cable buoyancy control system including a pressure chamber for gas, valve means for supplying gas from the chamber to a bladder, so that the expanding bladder will expel water in the cable into the surrounding environment, and a pump for pumping water from the surrounding environment into the cable under sufficient pressure to compress the gas in the bladder, and reduce the volume of the gas therein so as to decrease the buoyancy of the cable. Alternatively, the gas may be maintained at pressure lower than hydrostatic and the pump operated to expel water from the cable interior in order to increase cable buoyancy. One disadvantage of the Charske system is that intake and discharge of water (which may be contaminated) between the cable interior and the surrounding medium tends to cause the associated valves and flow lines to clog.

Another cable buoyancy control system is descried in U.S. Pat. No. 3,375,324, issued Mar. 26, 1968 to Miller. The Miller system employs a pair of buoyant fluid supply lines extending the length of a marine cable. One line is maintained at high pressure; the other at lower pressure. Valves divert fluid from the high pressure line into an annular space surrounded by a resilient outer jacket, causing the jacket to expand radially outward, thus increasing the cable buoyancy. Other valves divert fluid from the annular space into the lower pressure line to cause the jacket to contract radially, thus decreasing the cable buoyancy. The Miller system has the disadvantages that the two fluid supply lines are bulky (requiring a larger cable outside diameter) and require high capacity pressure maintenance equipment for maintaining one line at high pressure and the other at a lower pressure. Further, the mentioned valves in the Miller system are not remotely controllable. Rather, each valve opens or closes automatically, when the internal cable pressure reaches a preset limit. This type of independent, local control system has the tendency to yield an unstable condition.

The present invention represents an improvement over conventional cable systems because it permits global, automatic buoyancy control of individual cable sections by a central control unit, without the need for any high pressure buoyant fluid flow line extending the length of the cable, without transferring buoyant fluid between the cable interior and the surrounding medium, and without the disadvantage of humps and droops inherent in point control systems.

SUMMARY OF THE INVENTION

The inventive marine cable system includes an elongated bladder in each of one or more elongated cable sections, and a pump for transferring buoyant fluid into and out of each bladder. The density (hence the buoyancy) of each cable section may be controlled by varying the fluid volume in the bladder, thereby varying the bladder's volume. In one embodiment the outer skin of each cable section is elastic and serves as the associated bladder's outer surface.

In another embodiment each bladder has an elastic outer surface disposed within and separated from the outer skin of the cable section. In yet another embodiment, the buoyant fluid is compressible, and there is a rigid reservoir in fluid communication with each pump, so that each pump may transfer the compressible fluid to and from the associated bladder.

In the embodiment having a reservoir in each section, no fluid is transferred between the sections. In the other embodiments fluid is transferred between sections, but only between adjacent sections.

Depth sensors may be employed to measure the depth of each cable section, and the depth signals supplied to a central control unit. The central control unit generates control pulses to be supplied to each pump, in order to maintain each cable section at a desired depth.

DESCRIPTION OF THE PREFERRED EMBODIMENTS

Figure 1:
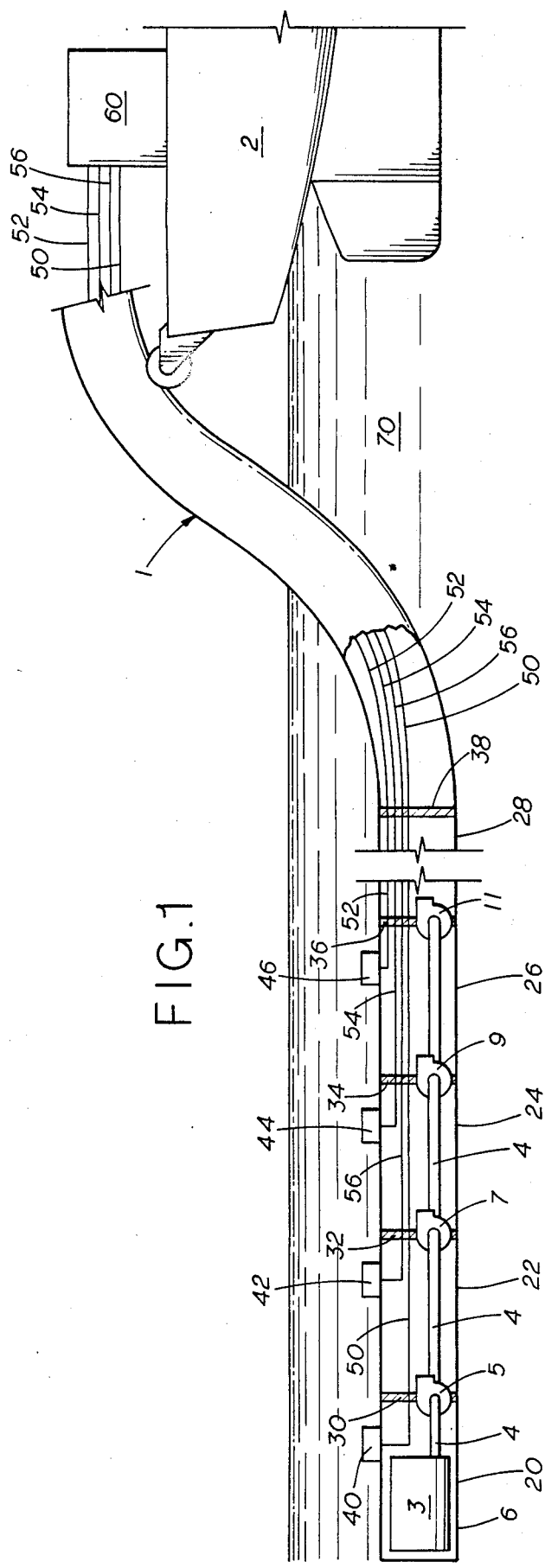
FIG. 1 is a simplified, cross-sectional view of a preferred embodiment of the inventive marine cable system, and a marine vessel for towing the marine cable.

A preferred embodiment of the inventive system will be described with reference to FIG. 1. Cable 1 is towed in body of water 70 by vessel 2. Outer ski 6 of cable 1 is impervious to fluid flow. Cable sections 20, 22, 24, 26, 28 are separated by bulkheads 30, 32, 34, 36 and pumps 5, 7, 9, and 11. Barrier 38 prevents fluid flow between portions of the cable on opposite sides of barrier 38.

Suitable pumps 5, 7, 9, and 11 may be selected from types commercially available that include remotely controllable valves and are capable of transferring fluid in both a first direction and an opposite direction. Since the volume of fluid moved by the pumps is relatively small (fluid is transferred only between adjacent cable sections), miniature pumps will be suitable for many applications of the inventive system. When all pump valves are closed no fluid may flow between the cable sections.

Fluid reservoir 3 stores buoyant fluid. Fluid flow line 4 permits the buoyant fluid to flow between reservoir 3 and nearest pump 5, between pump 5 and pump 7, and so on, providing fluid communication between each pair of adjacent pumps.

Each segment of flow line 4 between a pair of pumps should be made of elastic material so that its volume is variable in response to the amount of fluid contained within it. Each such segment of elastic flow line 4 serves as a bladder. By appropriately switching each pump into an "off" mode, a "positive" mode (in which the pump transfers fluid to the right in FIG. 1), or a "negative" mode (in which the pump transfers fluid to the left in FIG. 1), the buoyancy of the adjacent cable sections may be controlled.

For example, if the fluid in line 4 is incompressible and has lower density than the average density of the cable sections, transferring some of the fluid to section 24 from section 22 will increase the buoyancy of section 24 relative to section 22. This will result whether outer skin 6 of cable 1 deforms or does not deform. In the preferred embodiment shown in FIG. 2, (to be discussed in greater detail below), for example, the outer skin 120 of the cable there shown is elastic and the portion of skin 120 surrounding a given section expands radially outward when the amount of buoyant fluid enclosed within the section is increased. In the FIG. 1 embodiment, outer skin 6 may be elastic as in the FIG. 2 embodiment, or may be rigid.

The density of the buoyant fluid in line 4 must be different than the average average density of the cable sections, so that the overall cable section effective density (hence buoyancy) may be controlled by varying the amount of fluid within each section. Preferably, if the average density of the cable sections is $D_1$, and the density of the surrounding medium 70 is $D_2$, then the density $D_3$ of the buoyant fluid will satisfy $D_1 > D_2 > D_3$ (if $D_1 > D_2$) or $D_3 > D_2 > D_1$ (if $D_2 > D_1$).

In FIG. 1, a depth sensor is provided for each cable section. Depth sensor 40 measures the depth of section 20, sensor 42 measures the depth of section 22, sensor 44 measures the depth of section 24, sensor 46 measures the depth of section 26, and so on. It should be appreciated that there may be any number of sections in cable 1, but that preferably, there should be at least one depth sensor for each section. Each cable section and bladder should be elongated. Preferably the bladders will be so elongated (as shown in FIG. 1) that they effectively extend continuously along the length of the cable whose depth is to be controlled.

Depth sensors 40, 42, 44, and 46 are electrically connected by lines 50, 56, 54, and 52, respectively, to control unit 60 aboard vessel 2. An individual line (or more than one line) may extend between each sensor and control unit 60, or a single data bus may extend between the sensors and control unit 60 to convey multiplexed depth signals from the sensors. Alternatively, a radio or other communication link may be employed, in place of electrical lines or a data bus, to connect the sensors and control unit 60.

Similarly, electrical control lines, or a data bus, or a communication link connect each pump with control unit 60, although for simplicity these elements are not shown in FIG. 1. The manner in which control unit 60 operates will be described below with reference to FIG. 4.

Figure 2:
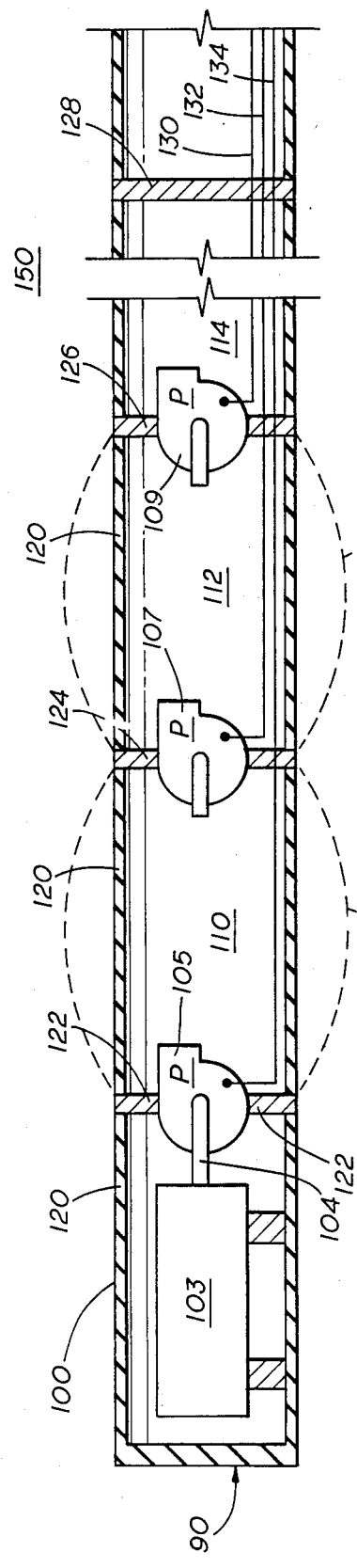
FIG. 2 is a simplified, cross-sectional view of another preferred embodiment of the inventive marine cable system.

FIG. 2 is a simplified cross-sectional view of a portion of an alternative preferred embodiment of the invention. Cable 90 in FIG. 2 includes sections 100, 110, 112, 114 (and others not shown). Reservoir 103 contains buoyant fluid. Bulkheads 122, 124, and 126 and pumps 105, 107, and 109 separate and isolate sections 100, 110, 112, and 114 as in the FIG. 1 embodiment, when the pumps (which are of the same type as in the FIG. 1 embodiment) are in a "closed" mode. Buoyant fluid may flow through flow line 104 between reservoir 103 and nearest pump 105. Unlike the FIG. 1 embodiment, no flow lines extend between adjacent pumps. Rather, buoyant fluid (which may be cable oil) occupies the interior of the sections between the pumps. The outer skin 120 of the cable is elastic, so that the cable sections themselves serve as bladders. When selected ones of the pumps are activated (such as by control signals from electrical lines 130, 132, and 134 connected to a remote control unit, not shown in FIG. 2, buoyant fluid is pumped from desired ones of the bladders (cable section interiors) to selected adjacent bladders. For example, in order to decrease the buoyancy of sections 110 and 112 if the buoyant fluid has density less than that of surrounding medium 150, pump 105 is operated to transfer fluid from reservoir 103 to section 110 (inflating outer skin 120 radially into the configuration indicated by dashed line 130a) and pump 107 is operated to transfer fluid from section 110 to section 112 (also inflating outer skin 120 radially into the configuration indicated by a dashed line 130b). Typically, the average density of cable 90 will be close to that of medium 150 when buoyant fluid is evenly distributed among the sections and outer skin 120 is in the normal configuration indicated by the solid lines in FIG. 2.

Figure 3:
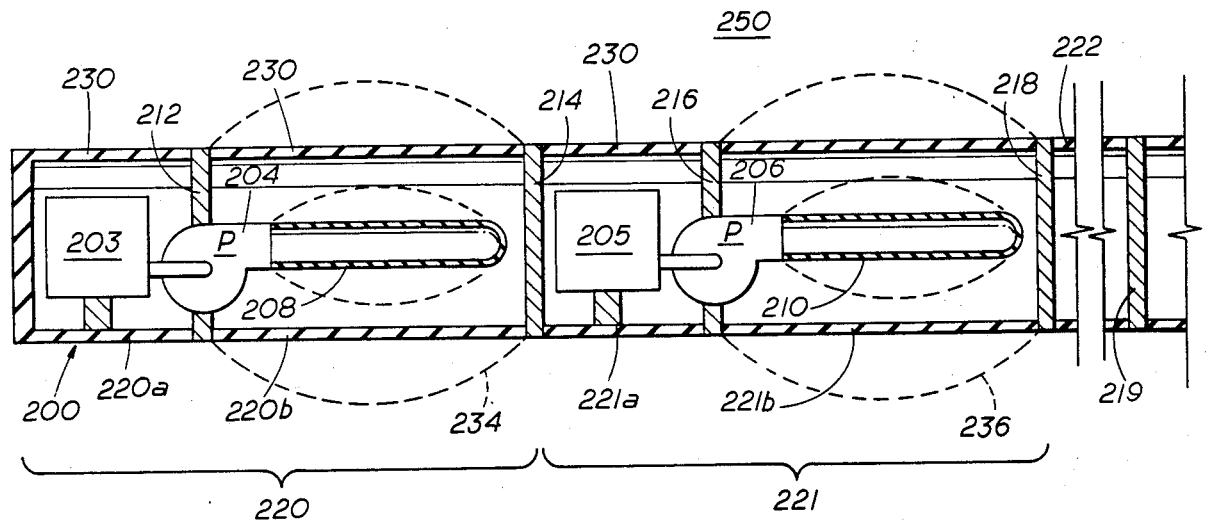
FIG. 3 is a simplified, cross-sectional view of another preferred embodiment of the inventive marine cable system.

Depth sensors may be attached to each section in the FIG. 2 embodiment (and in the FIG. 3 embodiment to be described below), as in the FIG. 1 embodiment. Each sensor should be connected electrically (or via a radio communication link) to a remote control unit, in the manner described with reference to FIG. 1.

In either the FIG. 1 or FIG. 2 embodiment, the fluid reservoir (3 or 103) may be located in any of a variety of positions, such as aboard towing vessel 2, in or near the section of the cable farthest form the towing vessel, or in a section of the cable closer to the towing vessel (such as the lead-in section nearest the towing vessel). Preferably, the reservoir will be located aboard the towing vessel, to eliminate the effects on the cable of the reservoir's adverse depth tendencies. Alternatively, by locating the reservoir at the cable's tail section (or integrating it within a tail buoy attached to the aft cable end) the effects of its adverse depth tendencies would be minimized over the active cable length. Another alternative aft reservoir location is a fixed canister acting as a point source of (positive or negative) buoyancy, which would be counteracted by a conventional bird. Yet another alternative aft reservoir location is a trailing, non-active cable section as shown in FIGS. 1 and 2. In this latter embodiment, the non-optimum buoyancy tendencies of the reservoir section may either be ignored, or counteracted by a conventional bird. A third inventive embodiment, employing a reservoir within each cable section, will next be described with reference to FIG. 3. In the FIG. 3 embodiment, compressible gas is employed as the buoyant fluid. Cable 200 has sections 220, 221, and 222 (and others not shown). Bulkheads 212 and 214 separate and isolate adjacent sections so that fluid may not flow therebetween. Section 220 includes rigid reservoir 203 containing compressed gas, pump 204, and elastic bladder 208. Section 220 is divided into compartments 220a and 220b by pump 204 and bulkhead 212. Similarly, section 221 includes rigid reservoir 205 for gas, pump 206, bladder 210, and bulkhead 216. Outer skin 230 of cable 200 is elastic. In order to increase the buoyancy (decrease the density) of a section, gas is released from the associated reservoir through an opened valve in the associated pump to inflate the bladder, causing the outer skin surrounding the section to expand radially (such as into configuration 234 shown by a dashed line). To decrease the buoyancy of the section, the pump is operated to force gas from bladder back into the reservoir, so as to decrease the volume enclosed by the outer skin surrounding the section. Depth sensors, and signal lines or communication links (not shown in FIG. 3) between the pumps and depth sensors and a remote control unit may be employed in the FIG. 3 embodiment as in the FIG. 1 or FIG. 2 embodiments. Depending on their effective density, the gas reservoirs may act as undesired point sources of negative or positive buoyancy. To counteract this undesired buoyancy point source effect, a conventional bird (not shown) may be attached to the cable adjacent each gas reservoir.

Figure 4:
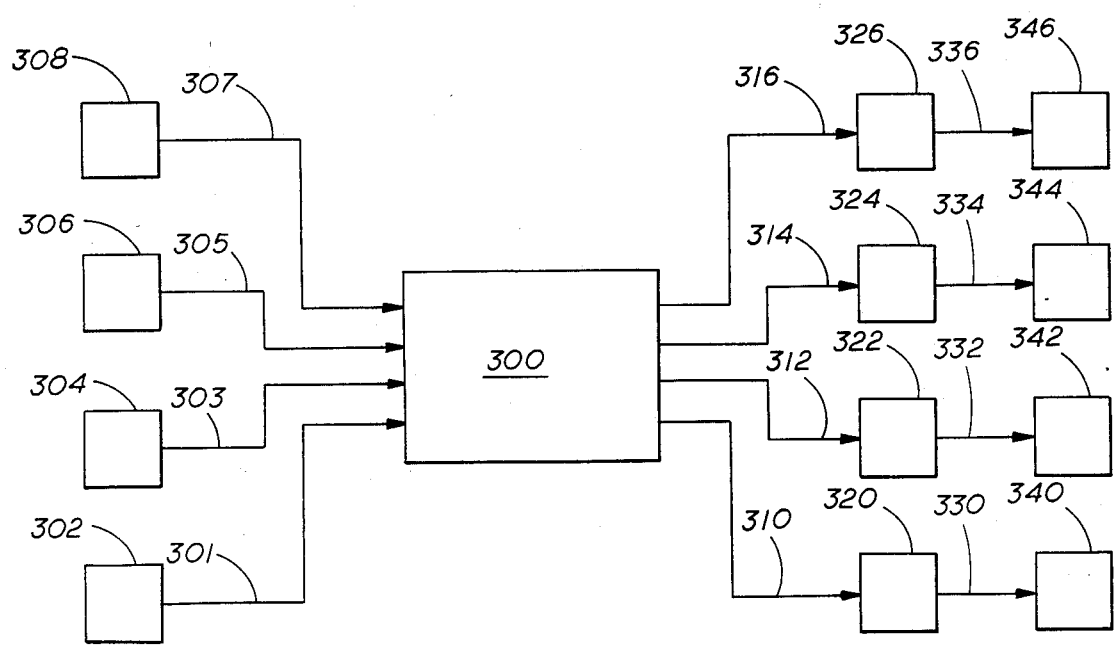
FIG. 4 is a block diagram illustrating the manner in which signals flow between depth control elements of a preferred embodiment of the inventive system.

The manner in which all embodiments of the invention will operate will be described with reference to the block diagram shown in FIG. 4. Depth sensors 302, 304, 306, and 308 are each associated with a different cable section. Although four are shown, it is within the scope of the invention to employ any number of cable sections and sensors. Depth signals 301, 303, 305, and 307 are provided as input to central processing unit 300. In CPU 300, analog depth input signals will be converted to digital form to further processing. Instead of from depth sensors, depth signals 301, 303, 305, and 307 may alternatively be supplied from an operator, for example, in order to produce a pre-selected buoyancy in each section. Typically, CPU 300 will be located aboard the towing vessel (such as within control unit 60 shown in FIG. 1). In response to the depth input signals, appropriately programmed CPU 300 will produce control signals 310, 312, 314, and 316, which are supplied to individual ones of the pumps.

Each of decoders 320, 322, 324, and 326 is associated with a different one of pumps 340, 342, 344, and 346. Decoder 320, for example, is associated with pump 340 which may correspond with pump 5 of the FIG. 1 system. Each decoder will receive the control signals for its pump and produce trigger pulses to switch open or closed desired ones of the pump valves or to energize the pump to transfer fluid in a forward or aft direction along the cable.

Trigger pulses 330, 332, 334, and 336 are produced respectively by decoders 320, 322, 324, and 326 in response to control signals 310, 312, 314, and 316.

Commercially available equipment, such as a Syntron Inc. Cable Utility System ®, may be employed in constructing the inventive system. For example, the RCL-3 Cable Leveler Subsystem of such Syntron Inc. Cable Utility System ® includes suitable decoders of the type mentioned in the previous paragraph as well as suitable depth sensors of the type that may be used in the inventive system.

The CPU of the inventive system may be suitably Programmed in a manner that will be readily apparent to an ordinarily skilled computer programmer having basic knowledge of the control theory of stable systems. An example of a suitable CPU is a Quark/PC BD-PC0002, manufactured by Megatel Computer Technologies. Alternatively, the Syntron Inc. Control Box CUS-8301 (a component of the Syntron Inc. Cable Utility System ®) may be employed as the CPU.

The global control techniques described will optimally minimize the amount of fluid transferred between cable sections. Preferably, fluid will be transferred between sections only when the cable is in an inactive mode (such as between seismic shots, when the cable is a streamer containing hydrophones), in order to eliminate pump-generated noise in the signals generated by sensors in the cable..

Conventional hardware, such as conductive wire pairs may be employed to convey depth and control signals between the CPU and the individual depth sensors and pumps. Such hardware is used in conventional cable systems to supply control signals to birds attached along a cable.

It should be understood that the embodiments described herein are illustrative only of the inventive concept, and that these embodiments should not be considered as limitations on the invention. Various changes in the apparatus described above may be within the scope of the appended claims.

I claim:

1. A marine cable system, including:
  (a) a cable having an outer skin impervious to fluid flow and enclosing at least two elongated cable sections that are connected end-to-end, each section including an elongated bladder whose volume varies in response to variations in the amount of fluid within the bladder in such a manner that the density of each section may be controlled by varying the amount of fluid in the bladder; and
  a pump disposed between each two adjacent sections, each said pump being capable of transferring fluid between the bladders in the adjacent sections in response to control signals.

2. The system of claim 1, also including:
  a reservoir adapted to contain fluid and disposed at a first end of the cable;
  a fluid flow line providing fluid communication between the reservoir and the bladder in the section nearest the first end of the cable.

3. The system of claim 2, wherein the reservoir is disposed in a reservoir cable section connected end-to-end to the cable section nearest the first end of the cable.

4. The system of claim 1, also including:
  a marine vessel for towing the cable;
  a reservoir adapted to contain fluid and disposed on the vessel; and
  a fluid flow line providing fluid communication between the reservoir and the bladder in the cable section towed nearest the vessel.

5. The system of claim, also including at least one hydrophone in each section.

* * * * *